March 3, 1964  M. F. KEMPER  3,122,890
APPARATUS FOR LINING TUNNELS WITH CONCRETE
Filed Oct. 27, 1959  7 Sheets-Sheet 2
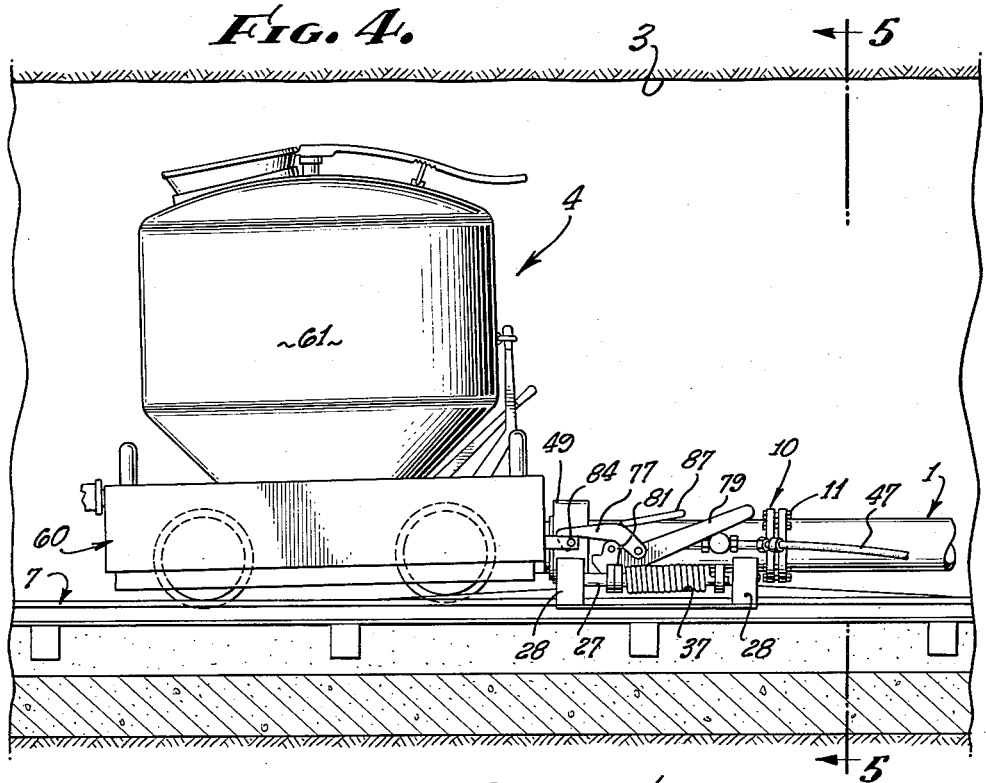
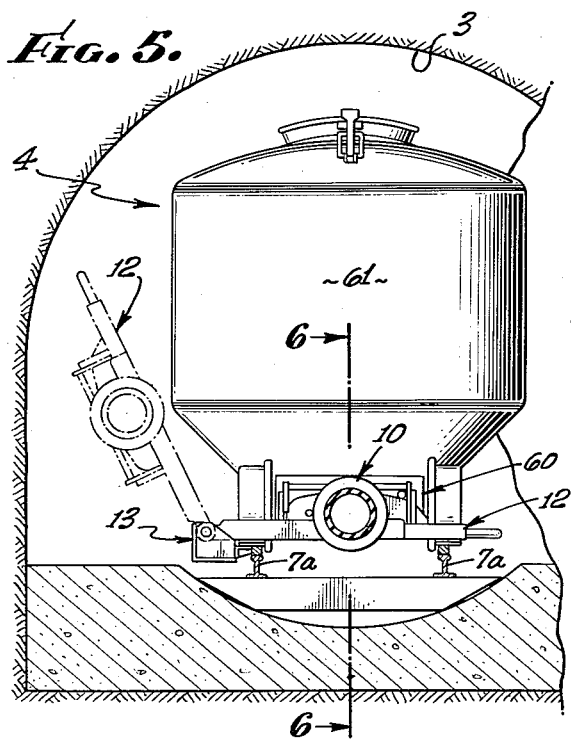
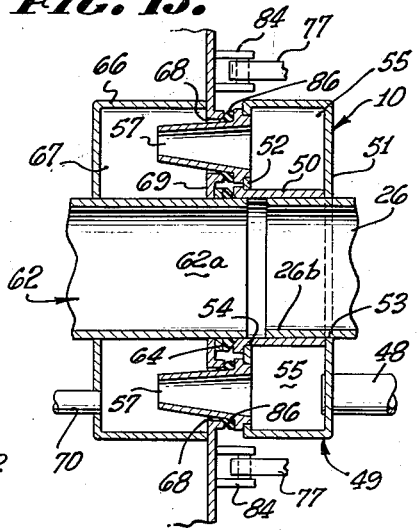
INVENTOR.
MAXWELL F. KEMPER
BY
Paul A. Weilein
ATTORNEY.

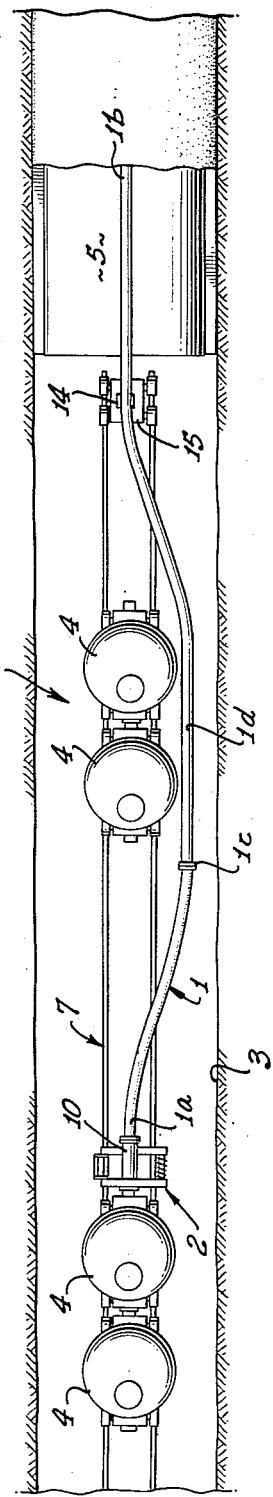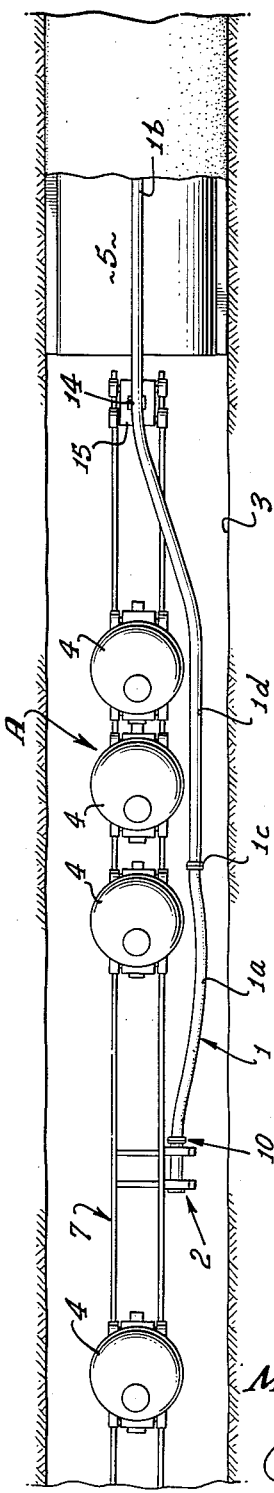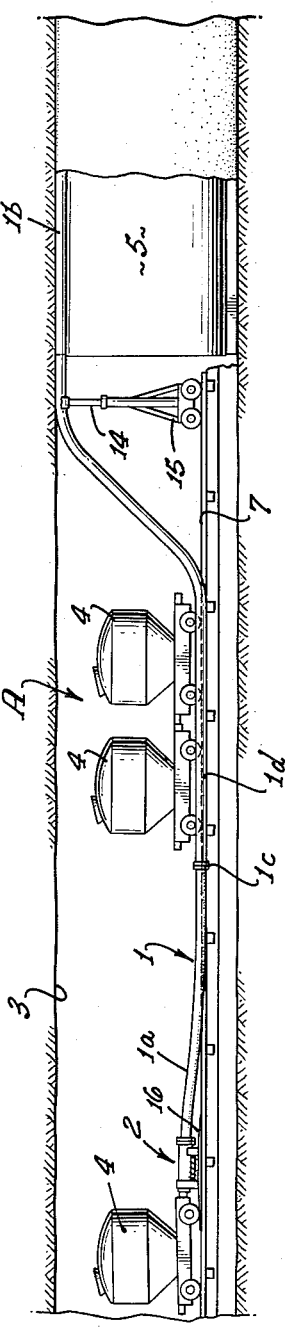

March 3, 1964 M. F. KEMPER 3,122,890
APPARATUS FOR LINING TUNNELS WITH CONCRETE
Filed Oct. 27, 1959 7 Sheets-Sheet 3
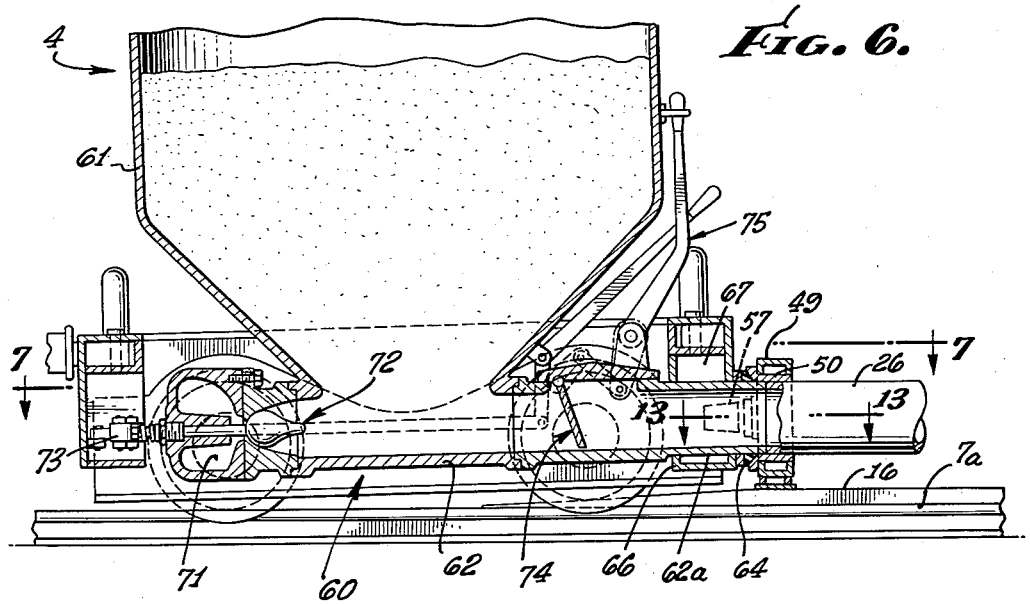
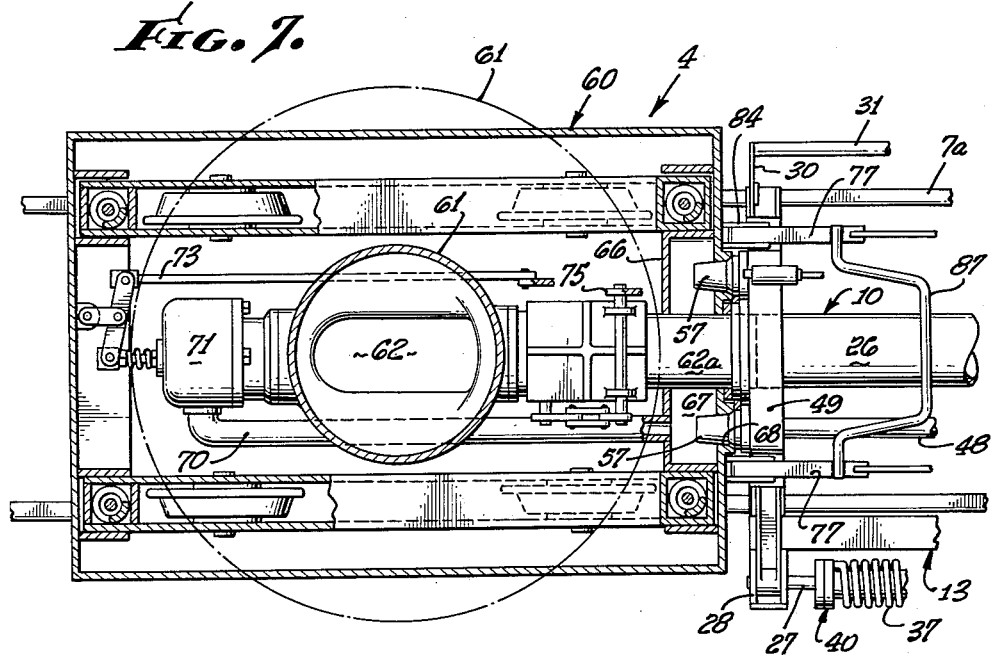
INVENTOR.
MAXWELL F. KEMPER
BY
Paul A. Weilein
ATTORNEY.

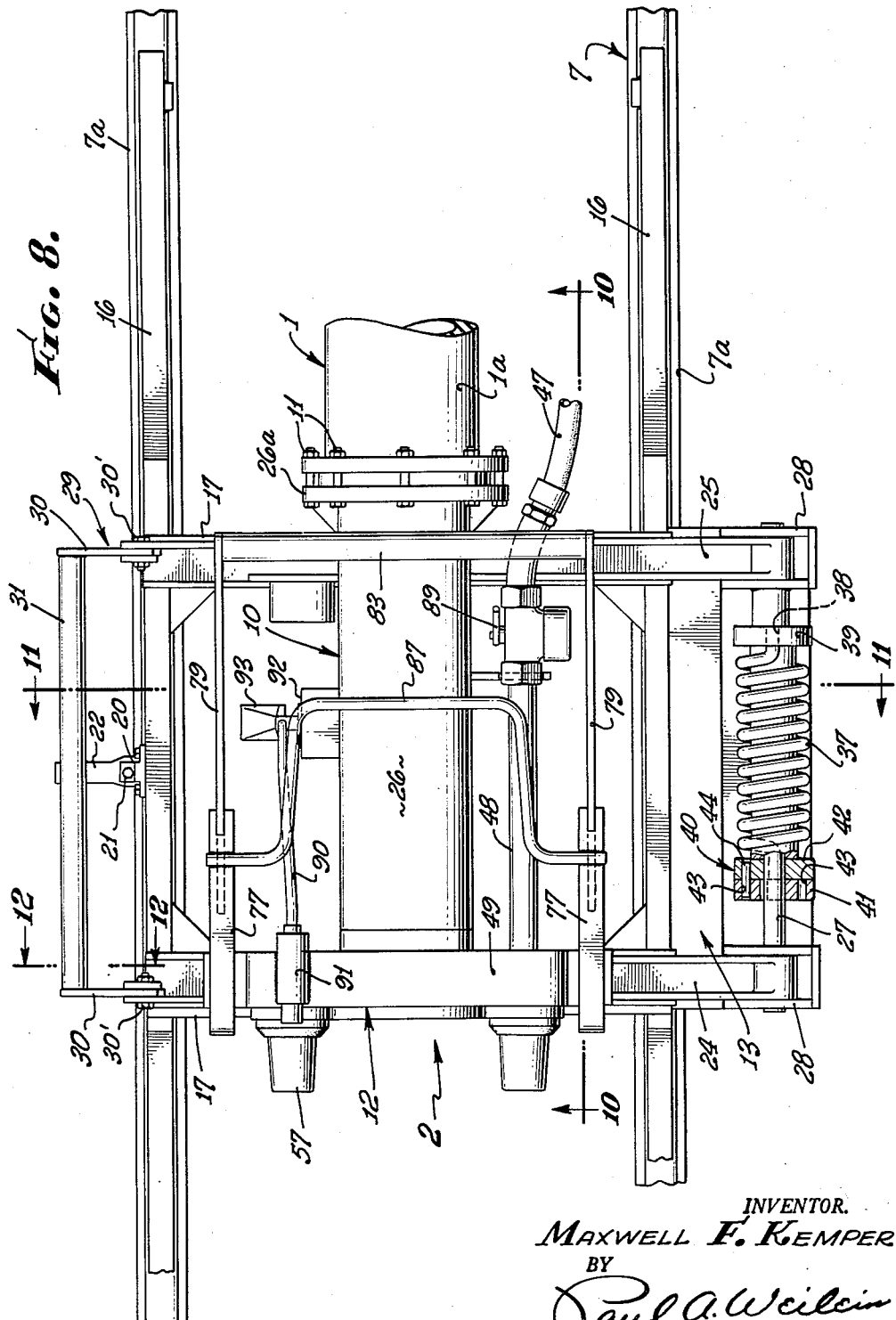

March 3, 1964 M. F. KEMPER 3,122,890
APPARATUS FOR LINING TUNNELS WITH CONCRETE
Filed Oct. 27, 1959 7 Sheets-Sheet 5
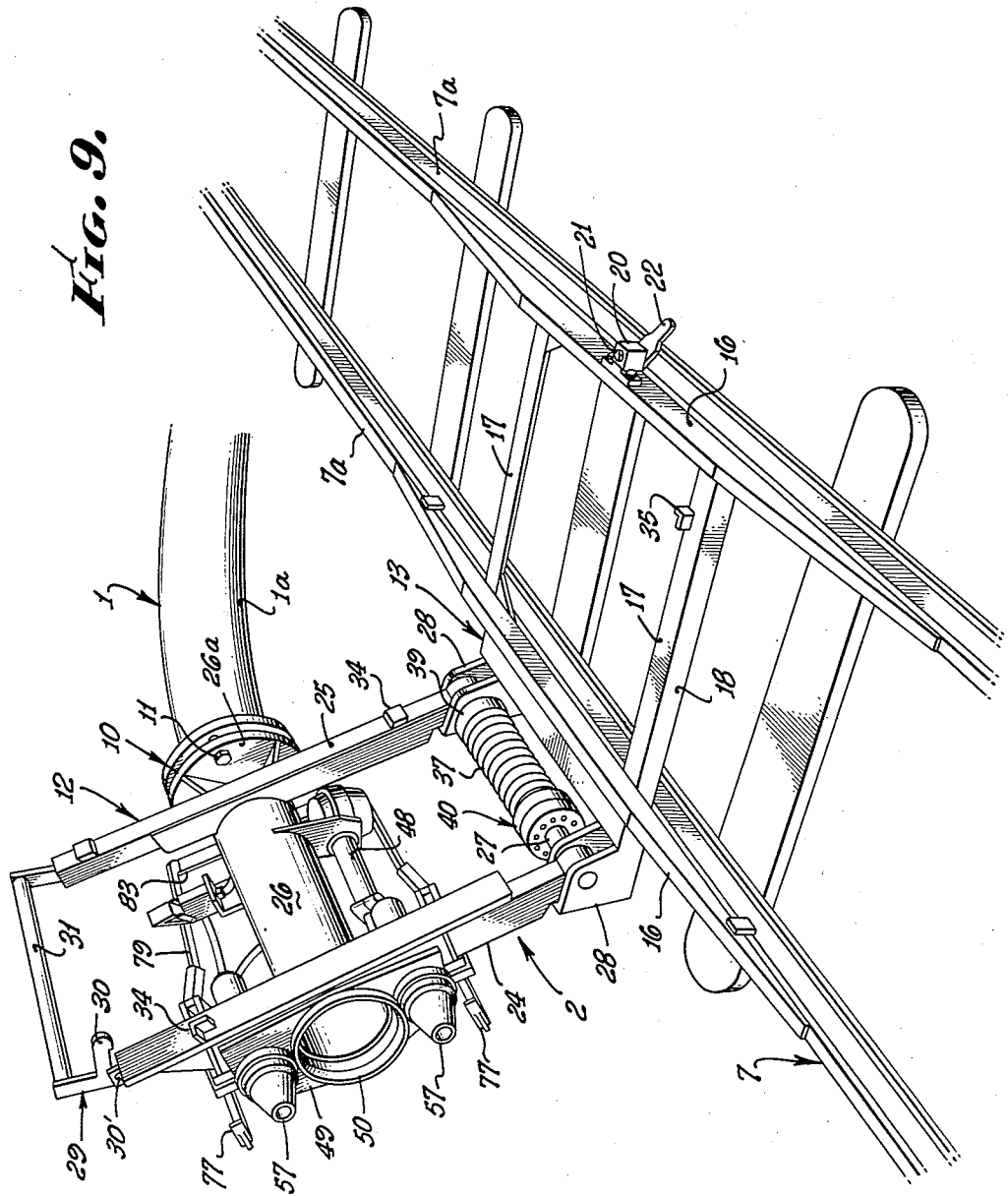
INVENTOR.
MAXWELL F. KEMPER
BY
Paul A. Weilein
ATTORNEY.

March 3, 1964 M. F. KEMPER 3,122,890
APPARATUS FOR LINING TUNNELS WITH CONCRETE
Filed Oct. 27, 1959 7 Sheets-Sheet 6
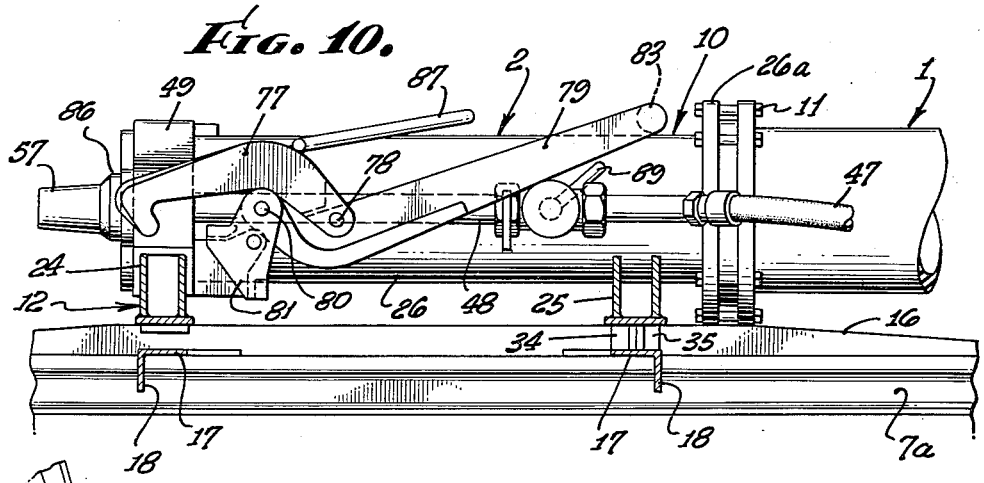
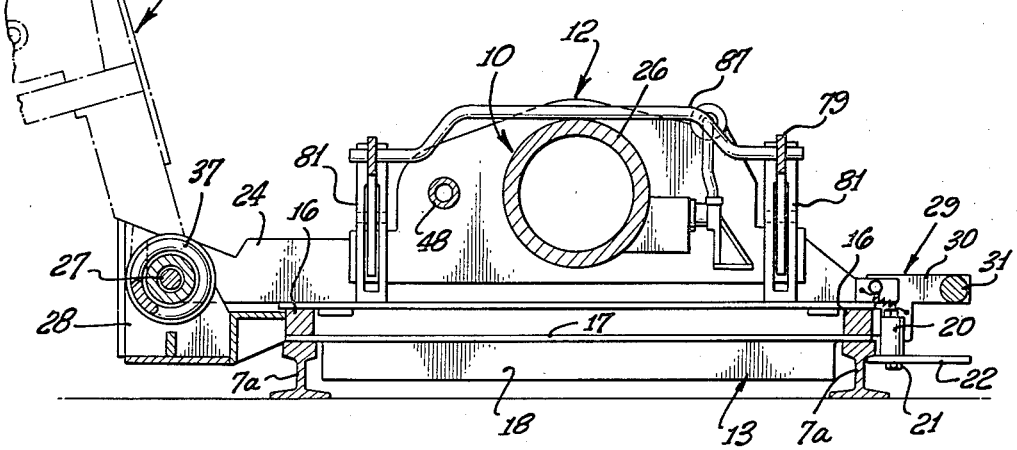
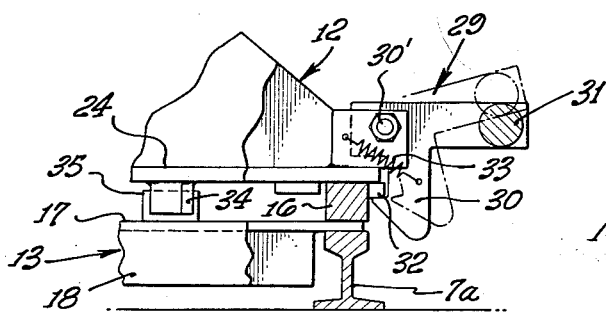
INVENTOR.
MAXWELL F. KEMPER
BY
Paul A. Weilein
ATTORNEY.

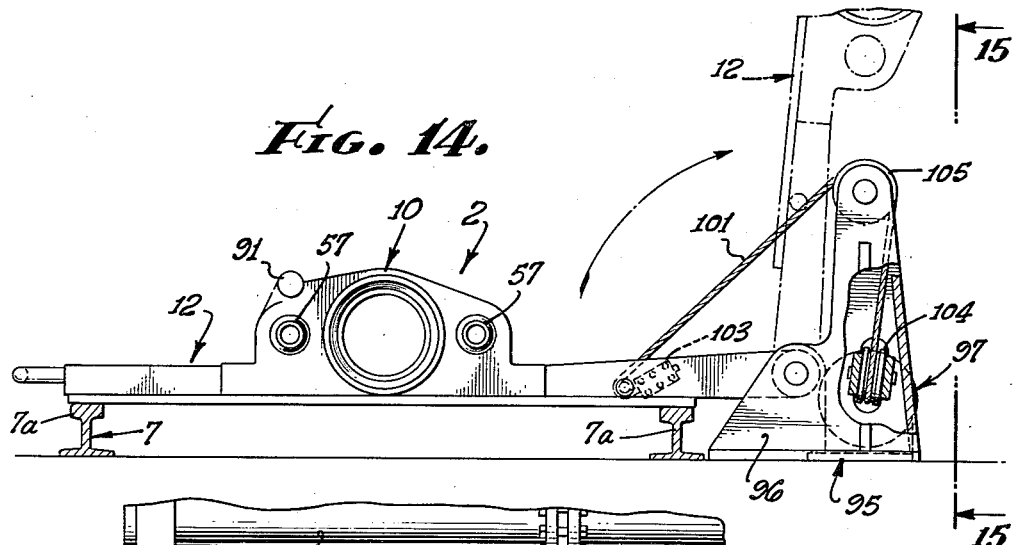
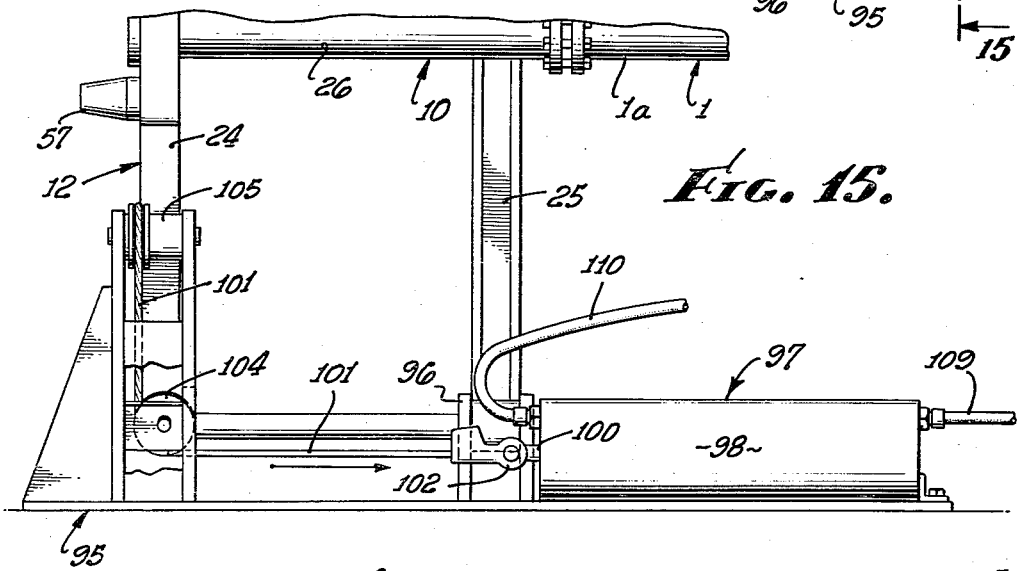
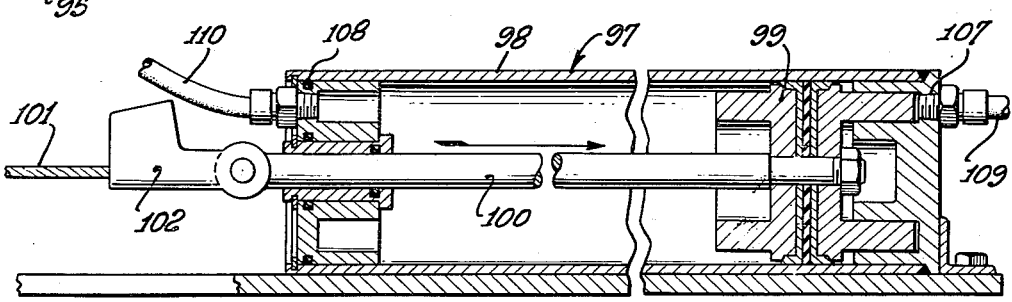

United States Patent Office 3,122,890
Patented Mar. 3, 1964

3,122,890
APPARATUS FOR LINING TUNNELS WITH CONCRETE
Maxwell F. Kemper, 3701 Overland, Los Angeles, Calif.
Filed Oct. 27, 1959, Ser. No. 849,016
15 Claims. (Cl. 61—42)

This invention relates to apparatus for effecting the placement of fluent material discharging from mobile containers and for permitting the containers to be moved in a particular manner in a confined space, especially in connection with certain building construction operations, as in lining tunnels with concrete. In this tunnel lining operation the concrete is carried into a tunnel by means of a string of mobile containers or cars on a track, the concrete being discharged from the containers into the forms through conduit means arranged to be coupled to successive containers in the string.

In my U.S. Letters Patent No. 2,660,034 issued November 24, 1953, there is shown apparatus for lining a tunnel with concrete wherein provision is made for moving the empty containers onto a sled mounted in advance of a string or train of containers. The conduit means is disposed beneath the sled with its intake end positioned to be releasably coupled with the containers. As each container is unloaded it is uncoupled from the conduit means and advanced onto the sled over the conduit means, thereby doing away with switching and bypassing of the placers. While this apparatus has been advantageous, it did not permit of the desired movement of the containers from the sled into and from the zone between the sled and the form, due to the conduit means and associated apparatus taking up the space between the sled and the form.

My pending application, Serial No. 344,960, filed March 27, 1953, now Patent No. 2,995,901 discloses similar tunnel lining apparatus which provides for the lifting of the conduit means out of the path of the mobile containers so as to clear a zone of adequate length between the intake end of the conduit means and the form. This makes it possible to move the containers freely over a ramp adjacent the intake end of the conduit, into and out of that zone. However, this apparatus requires an amount of head room which prohibited its use in certain small bore tunnels.

It is the primary object of this invention to provide apparatus of the character described which constitutes an improvement over similar apparatus heretofore produced in that it is more compact, comparatively simple as to construction, requires less head room than the mobile containers and may be used in small bore and large bore tunnels to provide the advantages of the apparatus shown in the aforementioned patent and pending application, respectively, and additional advantages hereinafter pointed out.

It is another object hereof to provide apparatus of the character described which achieves the foregoing objective by being operable to move the conduit means laterally into the path of movement of the mobile containers for connecting therewith, as well as laterally out of said path, without disposing the conduit means above the level of the tops of the containers and while taking up but a slightly greater amount of side room in the tunnel than the containers.

It is another object of this invention to provide apparatus of the character described in which support means for the conduit and the conduit are constructed and arranged so that when the intake end of the conduit is positioned for being coupled to the container, the greater portion of the conduit extending between the intake end thereof and the form is laterally offset from the path of movement of the containers in a zone defined alongside the offset portion of the conduit whereby the containers and other cars positioned in this zone may be moved back and forth therein and may be moved into and out of the zone when the intake end of the conduit is moved to a position laterally offset for the path of movement of the containers.

An additional object of this invention is to provide apparatus of the character described wherein a novel form of supporting means for the conduit means is mounted to one side of the path of movement of the mobile containers for movement of the supporting means between a first position extending transversely of the path of movement of the container with the conduit means disposed for coupling to a container, and a second position in which the support and the conduit are laterally offset from the path of movement of the containers to permit free movement of the containers or other work cars into and out of the zone between the support means and the form.

A further object of this invention is to provide apparatus such as next above described in which the support means for the conduit is releasably latched in the first position in which the conduit is disposed for being coupled to a container and wherein means are provided for moving the support and the conduit laterally to the second position one side of the path of movement of the containers and to hold the support and conduit in that position incident to release of the support from the first position.

It is another object to provide apparatus such as described wherein the support means for moving the conduit laterally of the track on which the containers are movable, is mounted on a mobile frame mounted on the track ahead of the containers whereby the apparatus may be advanced as required in the lining of the tunnel, there being rails or similar guide means on the frame providing for movement of the containers and work cars over the frame in either direction while the support means and conduit are clear of the track and the rails.

Other objects and advantages of the invention will be hereinafter described or will become apparent to those skilled in the art, and the novel features of the invention will be defined in the appended claims.

Referring to the drawings:

FIG. 1 is a schematic top plan view illustrating the manner in which apparatus embodying the present invention is employed in a tunnel to conduct concrete from a mobile container into the form, showing how the mobile containers may be disposed in the zone between the intake end of the conduit and the form during the delivery of concrete to the form;

FIG. 2 is a schematic top plan view corresponding to FIG. 1, showing how the intake end of the conduit and the major portion of the conduit may be disposed in laterally offset relation to the track whereby the concrete containers may be moved freely into and from the zone between the intake end of the conduit and the form, and also showing a loaded container ready to be moved into position to be coupled to the conduit when the latter is moved back in the position shown in FIG. 1;

FIG. 3 is a fragmentary schematic side elevational view of the apparatus shown in FIG. 1;

FIG. 4 is a side elevation of the apparatus embodying the present invention showing the conduit in coupled relation to a mobile concrete container in a tunnel;

FIG. 5 is a fragmentary sectional view taken substantially on the line 5—5 of FIG. 4, showing in dot-dash lines the support means for the intake end of the conduit and this intake end disposed in a generally upright position clear of the path of movement of the containers;

FIG. 6 is an enlarged fragmentary vertical section of one of the containers and the apparatus as shown in FIGS. 4 and 5 taken substantially on the line 6—6 of FIG. 5 and showing in section and in coupled relation the discharge portions of the container and portions of the coupling means for the conduit;

FIG. 7 is a fragmentary horizontal sectional view taken on the line 7—7 of FIG. 6;

FIG. 8 is an enlarged fragmentary top plan view of the apparatus for supporting the intake end of the conduit and coupling the conduit to the containers, shown in position for coupling the conduit to a container;

FIG. 9 is a perspective view of the apparatus shown in FIG. 8 with the conduit support shifted to a position disposing it and the conduit in laterally offset relation to the track;

FIG. 10 is a sectional view taken on the line 10—10 of FIG. 8;

FIG. 11 is a cross sectional view taken on the line 11—11 of FIG. 8;

FIG. 12 is a fragmentary sectional view taken on the line 12—12 of FIG. 8;

FIG. 13 is a fragmentary sectional view taken on the line 13—13 of FIG. 6;

FIG. 14 is a fragmentary elevational view partly in section of a modified form of apparatus embodying the present invention;

FIG. 15 is a sectional view taken on the line 15—15 of FIG. 14; and

FIG. 16 is an enlarged longitudinal sectional view of the power cylinder shown in FIG. 15.

In accordance with the present invention, discharging means in the form of a conduit 1 and mounting means 2 therefor are arranged in a tunnel 3, as shown schematically in FIGS. 1, 2 and 3, so that the conduit is operable for conducting concrete from mobile containers or cars 4 known as placers, into the form 5 for the tunnel lining. The containers 4 are operable in a string as a train on a track 7 leading along the tunnel to a point adjacent the form 5.

The mounting means 2 and the conduit 1 are constructed, arranged and operable to provide between the intake end of the conduit 1 and the form 5 a zone A capable of accommodating the containers 4 and other cars of the string or train. Accordingly, the major portion of the conduit 1 is disposed at all times to one side of the track 7, and the mounting means 2 provides for movement of a flexible intake portion 1a of the conduit 1 laterally of the track 7 between a position in which the intake end of the conduit is disposed over the track for connection with the leading container 4, and a position in which the intake end and the flexible portion 1a is laterally offset from the track, while substantially all of the conduit from the intake end thereof toward the form 5 lies to one side of the track.

The string of containers 4 is advanced into the position shown in FIG. 1 whereby the conduit 1 may be coupled to the leading container 4. As each container 4 is emptied, the intake end and flexible portion 1a of the conduit 1 is swung into position clear of the track 7 whereby the empty container may be moved past the intake end of the conduit and the mounting means 2 into the zone A as shown in FIG. 2, after which the conduit is swung back into position to be coupled to the next container and so on until all the containers are emptied and disposed in the zone A. The train of empty containers may be run out for refilling and then run back into the tunnel to the proper location for again discharging concrete into the form. With the progression of the lining operation along the tunnel, the conduit 1 and support means 2 are advanced appropriately along the track for operation as required.

Coupling means generally designated 10 and operable for coupling the conduit to the mobile containers 4, is connected with the intake end portion 1a of the conduit 1 by means of suitable fastenings 11, it being unnecessary to disconnect the conduit from the coupling means 10 during operation of the apparatus for conducting concrete into the form 5 from the string of the mobile containers 4.

The support means 2, as best shown in FIG. 9, for the coupling means 10 and the conduit 1, includes a frame 12 mounted for swinging movement on a mobile base frame 13 supported on the track 7.

The conduit 1 between the flexible portion 1a and the discharge end portion 1b need not be flexible. This discharge portion is positionable over and into the form 5 as required to discharge the concrete for lining the tunnel, being supported in an elevated position by means of a standard 14 carried by a small car 15 on the track 7. Thus, as here shown, the flexible portion 1a is coupled as at 1c to the non-flexible portion 1d of the conduit. With this arrangement the swingable frame 12, coupling means 10 and the flexible portion 1a of the conduit are movable as a unit relative to the base frame and the track 7 so as to be laterally offset from the track. Accordingly, the swingable frame 12 is movable between a down position in which it extends transversely of the track 7 and disposes the coupling means 10 for connection with the containers 4, and an up position in which the frame 12, the coupling means 10 and the flexible conduit portion 1a are laterally offset from the track. When the swingable frame 12, coupling means 10 and conduit portion 1a are in this out-of-the-way position relative to the track 7, the containers 4 may be run over rails 16 on the base frame 13 so as to enter and be removed from the zone A, between the frame 13 and the form 5.

The base frame 13, as shown in FIGS. 8, 9, 10 and 11, includes as the sides thereof, the rails 16 to which are joined rigid cross members 17. These cross members have downwardly extending flanges 18 which fit transversely as gauges between the rails 7a of the track 7, as shown in FIGS. 11 and 12, to prevent lateral displacement of the rails 16 which are aligned with and rest upon the track rails 7a. The rails 16 of the base frame 13 are tapered, as shown in FIG. 9, from the center to the ends thereof to facilitate smooth movement of the containers 4 thereover from and onto the track 7.

Means are provided on the base frame 13, as shown in FIGS. 8, 9 and 11, for releasably holding this frame against sliding movement on the track 7 and as here shown, comprises a bracket 20 fixed to one of the rails 16, as shown in FIG. 11, for pivotally supporting at 21 a wedge bar 22 movable to releasably, frictionally engage the underside of one of the track rails 7a. Upon moving the bar 22 out of frictional engagement with the track rails 7a, the base frame 13 with all associated elements thereon and connected thereto may be moved along the track to the required position as the lining operation progresses along the tunnel.

The swingable frame 12, as shown in FIGS. 8, 9 and 11, is rectangular and includes a front bar 24 and a rear bar 25 to which a rigid tubular member 26 is fixed as by welding so as to extend therebetween. The tubular member 26 is a part of the coupling means 10 and serves as a rigid part of the frame 12 with its discharge end 26a coupled to the conduit 1 by the aforementioned fastenings 11. Each of the bars 24 and 25 has one end mounted to turn about a horizontal axis provided by a shaft 27 rotatable in a pair of bearing units 28 fixed to one of the rails 16 and extending laterally therefrom as well as laterally outward from the adjacent track rail 7a. The bars 24 and 25 are fixed to the shaft 27 so that the frame 12 may swing between a down position in which it extends transversely over the base frame 13 and track 7 and an upwardly and outwardly inclined position in which containers 4 may be moved past the frame 12 and conduit 1.

Latch means 29, as shown in FIGS. 8, 9 and 12, are provided for releasably holding the swingable frame 12 in the down position extending transversely over the base frame 13 and the track 7. As here shown, this latch means includes a pair of latch hooks 30 pivoted as at 30' to the free ends of the bars 24 and 25 and joined by a cross bar 31 which serves as a handle for moving the latch hooks 30 into and from hooked engagement with a latch bar 32 fixed to the outer side of one of the main frame rails 16 and projecting laterally outwardly therefrom. A retractile spring 33 is connected with the frame 12 and one of the latch hooks 30 for urging the two latch hooks into latching position. When the swingable frame 12 is in down position the bars 24 and 25 rest on the rails 16 of the base frame 13 and have feet 34 thereon engageable with one of the cross members 17 and an upstanding member 35 on the other cross member 17 of the base frame 13 whereby the weight of the swingable frame 12 is borne by the cross members 17 as well as by the rails 16.

Counterbalancing means are provided for the swingable frame and as here shown in FIGS. 8 and 9, includes a torsion spring 37 mounted on the shaft 27 with one end fixed as at 38 to a bearing extension 39 of one of the bearing units 28 while the other end is secured to suitable adjusting means 40 operable to vary the force of the spring. This adjusting means as here shown, includes a disk 41 keyed to the shaft 27 in abutting relation to a disk 42 angularly adjustable about the shaft and to which an end of the spring 37 is fixed. The disks 41 and 42 have registering openings 43 extending axially therethrough for reception of a pin 44. Any suitable means, not shown, may be employed to angularly adjust the disk 42 for varying the force of the spring 37 after which the pin 44 is inserted in the registering openings 43 to hold the desired adjustment. The force of spring 37 may be regulated so that upon uncoupling of the coupling means 10 and release of the latch means 29, the swingable frame 10 will be moved into the up position clearing the track 7 and rails 16 for movement of the cars into and from the tunnel zone A between the base frame 13 and the form 5.

The coupling means for releasably connecting the conduit 1 with the mobile containers 4 is constructed to also connect the container 4 with a source of compressed air whereby the concrete in the containers may be forced under pressure through the conduit 1 into the form 5. Accordingly, as shown in FIGS. 8 and 10, a flexible compressed air line 47 leading from a source of compressed air, not shown, is coupled to a conduit 48 mounted on the swingable frame 12 and leading (see FIG. 13) to a housing 49 which forms a part of the front or outer cross bar 24 of the frame 12. As shown in FIG. 13, a tubular coupling sleeve 50 is mounted in the center of the housing 49, with end portions thereof welded to the opposed walls 51 and 52 of the housing so that one end of the bore of the sleeve 50 registers with an opening 53 in the wall 51 while the other end of the sleeve projects through an opening 54 in the wall 52. The tubular coupling member 26 has its intake end 26b extended through the opening 53 in the wall 51 into the tubular coupling sleeve 50, the member 26 being welded to the wall 51. The housing 49 with the sleeve 50 therein defines a compressed air chamber 55 which surrounds the sleeve and receives compressed air from the conduit 48 connected thereto. Projecting from the wall 52 of the housing 49 are a pair of tapered nozzles 57 which provide for delivery of compressed air from the chamber 55 to the mobile containers 4 in a manner which will be hereinafter fully described.

The mobile containers 4 are provided with coupling elements for cooperation with coupling means 10 on the swingable frame 12 and each of these containers is of substantially the same construction as the mobile container shown in the aforementioned U.S. Letters Patent and pending application, respectively. In this connection, it should be noted that other types of mobile containers may be employed provided they are adaptable to use of apparatus embodying the present invention and are constructed to discharge the concrete or other fluid material into the conduit 1 here shown, so as to force the concrete or other material through the conduit as required.

As shown in FIGS. 4, 5, 6 and 7, each of the mobile containers 4 includes a wheeled frame 60 supporting a tank 61 for containing a supply of concrete or other fluid material. A discharge conduit 62 leads from the tank 61, as shown in FIG. 6, for conducting the concrete therefrom and has its discharge or free end 62a disposed at one end of the frame in position to be coupled to the conduit 1 through the coupling means 10 on the swingable frame 12. FIG. 13 shows how the discharge end 62a of the conduit 62 is telescoped by the coupling sleeve 50 to establish communication between a mobile container 4 and the conduit 1 through the discharge conduit 62 on the mobile container, the coupling sleeve 50 and the tubular coupling member 26 to which the conduit 1 is connected. A suitable sealing ring or packing element 64 is provided around the exterior of the discharge end 62a for engagement by the outer end of the coupling sleeve 50 to form a leak-proof coupling of the end 62a with the sleeve 50.

A housing 66 on the wheeled frame 60 of each container 4 surrounds the conduit 62, as shown in FIGS. 6, 7 and 13, inwardly of the discharge end 62a to form a chamber 67 having openings 68 in a wall 69 thereof. The openings 68 are adapted to receive the nozzles 57 so that compressed air from the chamber 55 of the coupling means 10 will be directed into the chamber 67, thence through a conduit 70 leading from the chamber 67, into a valve chamber 71 at one end of the discharge conduit 62. A valve unit 72 in the chamber 71 controlled by manually operable means 73 on the container 4, provide for introduction of compressed air into the conduit 62 for forcing the concrete therefrom under pressure. A valve 74 in the conduit 62 is operated by the means 75 to control flow of the concrete through the conduit 62.

Means are provided, as shown in FIGS. 4, 7, 8, 9 and 10, for releasably latching the swingable frame 13 to the container 4, and includes a pair of latch hooks 77 pivoted as at 78 on levers 79, which latter are pivoted as at 80 on brackets 81 on the cross bar 24. These levers are joined by a cross member or handle 83 at their outer ends and are operable as a unit to tightly engage the latch hooks 77 with eyes 84 (see FIGS. 4 and 13) fixed on the end of the frame 61 on each mobile container 4. Downward movement of the levers 79 will apply through the hooks 77, a force tightly engaging the coupling sleeve 50 with the discharge end 62a of the discharge conduit 62 on the container 4, also tightly engaging the nozzles 57 in the openings 68. Suitable sealing rings 86 are provided around the tapered nozzles 57 to seal against the wall 69 in which the openings 68 are formed.

A bail 87 is connected with the latch hooks 77 and serves as a handle to aid in placing the hooks on the eyes 84 and in removing the hooks therefrom.

A manually operable control valve 89 is mounted in the air conduit 48 on the frame 12 for controlling flow of compressed air into the chamber 55, thence into the container 4 coupled to the conduit 1 through the coupling means 10.

The swingable frame 12 may also be provided with means as here shown, for supplying compressed air for operating a conventional concrete vibrator, not shown, which is disposed in the tank of each container 4. For this purpose, as shown in FIG. 8, a pipe line 90 is coupled to the air conduit 48 on the frame 12 and leads to a projecting nozzle 91 on the cross bar 24 of the frame 12. This nozzle is adapted to be coupled with a socket (not shown) to which latter the aforementioned vibrator is coupled in any suitable manner. A valve 92 is mounted in the pipe line 90 and is controlled by operating means 93 to supply air to the nozzle 91.

A modified form of apparatus embodying the present invention is shown in FIGS. 14, 15 and 16 and differs from the previously described apparatus shown in FIGS. 1 through 13 in the construction and arrangement of the means for mounting the swingable frame and in providing power-operated means for moving the swingable frame laterally of the track into and from the same positions as provided by the first described apparatus.

Inasmuch as the swingable frame, coupling means, delivery conduit and other elements associated with this frame in this modified apparatus are of the same construction and arrangement in the first described apparatus, they are identified by the same reference characters as appear in FIGS. 1 through 13.

The mounting means for the swingable frame 12 in this modified form of the apparatus makes it unnecessary to provide the base frame 13 as shown in FIGS. 1 through 13. Instead, a portable and elongate base structure 95 is positioned alongside the track 7 and provides brackets 96 on which the frame 12 is pivotally mounted to swing between a down position over the track 7 and an up position, in the same manner as in the previously described apparatus, but responsive to power-operated means 97. This power-operated means includes a cylinder 98 mounted on the base 95, a piston 99 reciprocable in the cylinder, a piston rod 100 and a flexible element 101 connected at one end as at 102 with the piston rod and at its other end as at 103 with the frame 12. Pulleys 104 and 105 are appropriately positioned on the base 95 for leading the flexible element 101 to the frame 12, whereby upon reciprocable movement of the piston 99 the frame 12 will be moved between positions for coupling the conduit 1 to a container 4 and the upright position in which the containers are movable on the track past the frame 12 and its mounting means in the same manner as in the first described apparatus.

The piston 99 is reciprocated in the cylinder 98 by fluid under pressure which is directed into the ends of the cylinder through ports 107 and 108 connected to fluid lines 109 and 110 leading from a source of supply of fluid under pressure not shown. Valve means, not shown, may be operatively connected with the lines 109 and 110 for controlling the operation of the piston.

Any suitable means, not shown, may be employed to move this modified form of the apparatus along the track 7 as the tunnel lining operation advances in the tunnel. A locomotive unit, not shown, is usually employed to move the string of container cars 4 and other cars along the track 7, and by use of a chain or wire line, neither of which is shown, this modified apparatus, as well as the apparatus shown in FIGS. 1 through 13, may be connected with the locomotive for moving the apparatus as required as the lining operation advances in the tunnel.

The modified apparatus shown in FIGS. 14, 15 and 16 takes up substantially no more tunnel space than the apparatus shown in FIGS. 1 through 13, and may be operated efficiently in small bore tunnels as well as in larger tunnels.

While the embodiments of this invention are primarily intended for use in tunnels, it is to be understood that they may be used to advantage in other construction operations where mobile containers are movable in a given path in narrow spaces which preclude the use of double tracks and switching arrangements for moving the containers one past the other.

While specific structural details have been shown and described, it should be understood that changes and alterations may be resorted to without departing from the spirit of the invention as defined in the appended claims.

I claim:

1. In apparatus for discharging material from a mobile container movable along a given path: discharging means for connection with said container to conduct the material therefrom; means movable in a path spaced laterally from and extending alongside said given path mounting said discharging means for movement between a first position in which said discharging means is disposed in said given path for connection with said container, and a second position in which said discharging means is disposed to one side of said given path; latch means for releasably holding said mounting means in said first position; and means operable incident to release of said latch means to move said mounting means into said second position.

2. In apparatus for discharging material from a mobile container movable along a given path: discharging means for connection with said container to conduct the material therefrom; a movable support for said discharging means; means extending laterally outwardly from and movable alongside said given path mounting said support for movement with said discharging means between a first position in which said support and said discharging means obstruct movement of said container in one direction in said given path with said discharging means disposed for connection with said container, and a second position in which said support and said discharging means are removed from said obstructing position; latch means for releasably holding said support and said discharging means in said first position; and means operable in response to release of said latch means for moving said support and said discharging means into said second position.

3. In apparatus for discharging material from a mobile container movable on a track: a frame mounted on said track ahead of said container; discharging means for connection with said container to conduct material therefrom; a support on which said discharging means is mounted; said frame having a portion extending laterally outwardly from said track; means mounting said support on said laterally extended portion of said frame providing for movement of said support between a first position in which said support extends transversely of said track over said frame into the path of movement of said container with said discharging means disposed for connection to said container, and a second position to one side of said track in which said support and said discharging means are disposed to permit movement of said container past said discharging means and said support; and guiding means on said frame affording movement of said container thereon from the portion of the track leading to said frame onto the portion of said track leading from said frame while said support is in said second position.

4. In apparatus for discharging material from a mobile container movable on a track: a frame constructed to be mounted on said track ahead of said container; rails on said frame on which said container may be moved over said frame; a tubular member for connection with said container to conduct the material therefrom; a support for said tubular member; said frame having a portion extending laterally therefrom to one side of said track; means mounting said support on said laterally extending portion of said frame for movement between a first position in which said support extends transversely of said track over said frame with said tubular member disposed for connection with said container, and a second position in which said container is movable on said rails past said support and said tubular member; means for releasably coupling said tubular member to said container; means for releasably holding said support in said first position; and means operable upon release of said tubular member from connection with said container and release of said support while in said first position, urging said support toward said second position.

5. In apparatus for discharging material from a mobile container movable on a track: a frame mounted on said track ahead of said container and subject to movement along said track; means for releasably holding said frame against movement along said track; a tubular member for connection with said container to conduct material therefrom; means for releasably coupling said tubular member to said container; said frame having a lateral extension projecting outwardly from said track; a support on which said tubular member is mounted; means mounting said support on said lateral extension of said frame for movement between a first position in which said support extends transversely of said track over said frame with said tubular member disposed in the path of movement of said container for connection with said container, and a second position in which said support and said tubular member are disposed out of the path of movement of said container; and a track on said frame providing for movement of said container between the portion of the track leading to said frame and the portion of the track leading from said frame while said support is in said second position.

6. In apparatus for discharging material from a mobile container movable on a track: a frame mounted on said track ahead of said container and subject to movement along said track; means for releasably holding said frame against movement along said track; a tubular member for connection with said container for conducting material therefrom; means for releasably coupling said tubular member to said container; a support on which said tubular member is mounted; said frame having a portion laterally offset from said track; means mounting said support on said laterally offset portion of said frame for swinging movement in a path transversely of said track between a first position in which said support extends over said frame with said tubular member disposed in the path of movement of said container for connection with said container, and a second position in which said support and said tubular member are laterally offset from the path of movement of said container; means for releasably holding said support in said first position; means operating upon release of said tubular member from said container and release of said support from said first position to urge said support into said second position; and a track on said frame providing for movement of said container between the portion of the track leading to said frame and the portion of the track leading from said frame while said support is in said second position.

7. In apparatus for discharging material from a mobile container movable on a track: a frame mounted on said track ahead of said container and subject to movement along said track; means for releasably holding said frame against movement along said track; a tubular member for connection with said container to conduct material therefrom; means for releasably coupling said tubular member to said container; a support for said tubular member; said frame having a portion laterally offset from one side of said track; means mounting said support on said laterally offset portion of said frame providing an axis laterally spaced from one side of said track and about which said support may be swung in a path transversely of said track between a first position extending over said frame with said tubular member in position to be coupled to said container, and a second position in which said support is disposed in an upright position to one side of said track; and means for releasably holding said support in said first position.

8. In apparatus for discharging material from a mobile container movable in a given path: a conduit for conducting material from said container adapted to be positioned so that the greater portion thereof is disposed to one side of said path; coupling means for releasably connecting an end portion of said conduit to said container; a support on which said coupling means and said end portion of said conduit are mounted; and means bodily movable along said path relative to said mobile container and disposed in laterally spaced relation to one side of said path mounting said support for swinging movement about an axis extending parallel to said path, between a first position in which the support extends transversely of said path with said coupling means disposed for connection to said container, and a second position in which said support extends upwardly from said axis and is disposed with said coupling means and said end portion of said conduit out of the path of movement of said container.

9. In apparatus for discharging material from a mobile container movable in a given path: a support structure; means movable along said path relative to said mobile container in a path laterally spaced from said given path; pivot means mounting said support structure on said relatively movable means for movement transversely of said given path between a down position in which said structure extends over said given path and obstructs movement of said container in one direction and an up position in which said structure extends upwardly from said mounting means to one side of said given path to permit movement of the container in said one direction past said structure and said mounting means; and discharge means mounted on said structure for connection with said container to conduct material therefrom when said structure is in said down position; said discharge means being disposed out of said given path in a position permitting said movement of said container past said structure and said mounting means when said structure is in said up position.

10. A conduit coupling for connection to a container movable along tracks, comprising: a frame shiftable along said tracks; a coupling support; mounting means for said support connected to said frame and disposed in laterally spaced relation to one side of said tracks for movement alongside said tracks relative to said container; conduit coupling means on said support; and means pivotally connecting said coupling support to said mounting means providing for swinging said support about its pivotal mounting from a position extending across said tracks to a substantially upright position to one side of said tracks.

11. A conduit coupling for connection to a container movable along tracks, comprising: a frame shiftable along said tracks; a coupling support; mounting means for said support connected to said frame and disposed in laterally spaced relation to said tracks for movement alongside said tracks relative to said container; conduit coupling means on said support; means pivotally connecting said coupling support to said mounting means and providing for swinging said support about its pivotal mounting from a position extending across said tracks to a substantially upright position to one side of said tracks; and means for releasably latching said support in the first-mentioned position.

12. In apparatus for discharging material from a mobile container movable along a given path: discharging means for connection with said container to conduct material therefrom; means for releasably coupling said discharging means with said container; mounting means for said discharging means movable transversely of said given path between a position obstructing movement of said container and affording connection of the discharging means with said container and a position in which said mounting means and said discharging means are laterally spaced from said path to permit movement of said container past said discharging means and said mounting means; said mounting means including a base located in laterally spaced relation to one side of said container and said path; and a structure pivoted on said base and supporting said discharging means for pivotal movement between said positions.

13. In apparatus for discharging material from a mobile container movable along a given path: discharging means for connection with said container to conduct material therefrom; means for releasably coupling said discharging means with said container; mounting means for said discharging means movable transversely of said given path between a position obstructing movement of said container and affording connection of the discharging means with said container and a position in which said mounting means and said discharging means are laterally spaced from said path to permit movement of said container past said discharging means and said mounting means; said mounting means including a base located in laterally spaced relation to one side of said container and said path; and a rigid structure pivoted on said base on an axis substantially parallel to said path and supporting said discharging means for pivotal movement between said positions.

14. In apparatus for discharging material from a mobile container means movable along a given path: tubular discharging means for connection with said container to conduct material therefrom; means for coupling said discharging means with said container and including a movable latch carried by one of said means and releasably engaging the other; mounting means for said discharging means movable transversely of said given path between a position obstructing movement of said container and affording connection of the discharging means with said container and a position in which said mounting means and said discharging means are laterally spaced from said path to permit movement of said container past said discharging means and said mounting means; said mounting means including a base located in laterally spaced relation to one side of said container and said path; and a structure pivoted on said base and supporting said discharging means for pivotal movement between said positions.

15. In apparatus for discharging material from a mobile container movable along a given path; discharging means for connection with said container to conduct material therefrom; means for releasably coupling said discharging means with said container; mounting means for said discharging means movable transversely of said given path between a position obstructing movement of said container and affording connection of the discharging means with said container and a position in which said mounting means and said discharging means are laterally spaced from said path to permit movement of said container past said discharging means and said mounting means; said mounting means including a base located in laterally spaced relation to one side of said container and said path; and a structure pivoted on said base on an axis spaced front and substantially parallel to said path and below the point of coupling between said discharging means and said container and supporting said discharging means for pivotal movement between said positions.

References Cited in the file of this patent

UNITED STATES PATENTS

| | | |
|---|---|---|
| 1,716,588 | Kirchner | June 11, 1929 |
| 2,660,034 | Kemper | Nov. 24, 1953 |
| 2,865,521 | Fisher et al. | Dec. 23, 1958 |
| 2,893,741 | Pilch | July 7, 1959 |